(12) United States Patent
Li

(10) Patent No.: US 11,875,554 B2
(45) Date of Patent: Jan. 16, 2024

(54) METHOD FOR GENERATING IMAGE LABEL, AND DEVICE

(71) Applicant: BOE Technology Group Co., Ltd., Beijing (CN)

(72) Inventor: Yue Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 31 days.

(21) Appl. No.: 17/548,019

(22) Filed: Dec. 10, 2021

(65) Prior Publication Data
US 2022/0237901 A1 Jul. 28, 2022

(30) Foreign Application Priority Data
Jan. 27, 2021 (CN) .......................... 202110108926.2

(51) Int. Cl.
| | | |
|---|---|---|
| G06F 16/58 | (2019.01) | |
| G06V 10/774 | (2022.01) | |
| G06V 10/80 | (2022.01) | |
| G06V 10/40 | (2022.01) | |
| G06V 10/94 | (2022.01) | |
| G06V 10/22 | (2022.01) | |
| G06N 3/044 | (2023.01) | |

(52) U.S. Cl.
CPC ...... *G06V 10/7747* (2022.01); *G06F 16/5866* (2019.01); *G06N 3/044* (2023.01); *G06V 10/22* (2022.01); *G06V 10/40* (2022.01); *G06V 10/806* (2022.01); *G06V 10/95* (2022.01)

(58) Field of Classification Search
CPC .... G06V 10/7747; G06V 10/22; G06V 10/40; G06V 10/806; G06V 10/95; G06V 10/454; G06V 10/774; G06V 10/82; G06F 16/5866; G06F 16/55; G06F 18/253; G06N 3/044; G06N 3/045; G06N 3/08

See application file for complete search history.

(56) References Cited

U.S. PATENT DOCUMENTS

| | | | |
|---|---|---|---|
| 2019/0228529 A1* | 7/2019 | Sun | .......................... G06T 7/143 |
| 2020/0089985 A1* | 3/2020 | Wang | ................. G06V 30/1463 |
| 2020/0242153 A1* | 7/2020 | Luo | .......................... G06F 18/22 |

FOREIGN PATENT DOCUMENTS

CN 111368849 A * 7/2020 ............. G06K 9/342

OTHER PUBLICATIONS

Cheng et al, Multi-class geospatial object detection and geographic image classification based on collection of part detectors, 2014, ISPRS Journal of Photogrammetry and Remote Sensing 98: 119-132. (Year: 2014).*

(Continued)

*Primary Examiner* — John Villecco
*Assistant Examiner* — Kathleen M Broughton
(74) *Attorney, Agent, or Firm* — IPro, PLLC

(57) ABSTRACT

Provided is a method for generating an image label, including: acquiring a partial image of a target image after acquiring the target image with a label to be generated; then, acquiring a plurality of features based on the target image and the partial image, wherein the plurality of features include a first feature of the target image and a second feature of the partial image; and finally, generating a first-type image label of the target image based on the first feature and the second feature.

15 Claims, 8 Drawing Sheets

(56) References Cited

OTHER PUBLICATIONS

Xiao et al, Application of Two-level Attention Models in Deep Convolutional Neural Network for Fine-grained Image Classification, 2015, IEEE Computer Vision Foundation, 1-9. (Year: 2015).*
Lisin et al, Combining Local and Global Image Features for Object Class Recognition, 2005, IEEE Computer Vision and Pattern Recognition, 1-8. (Year: 2005).*

* cited by examiner

METHOD FOR GENERATING IMAGE LABEL, AND DEVICE

The present disclosure claims priority to Chinese Patent Application No. 202110108926.2, filed on Jan. 27, 2021 and entitled "METHOD AND APPARATUS FOR GENERATING IMAGE LABEL, AND DEVICE", the disclosure of which is herein incorporated by reference in its entirety.

TECHNICAL FIELD

The present disclosure relates to a method for generating an image label and a device.

BACKGROUND

In some scenarios, it is necessary to add labels to images. The labels are beneficial to the classification and search of the images, and can also be used for data analysis, information recommendation, and the like. For example, for painting images, category labels such as Chinese painting, oil painting, sketching, gouache, watercolor, etc. can be added; subject labels such as landscape, people, animals, etc. can also be added; and content labels such as the sky, houses, mountains, water, horses, etc. can be further added.

SUMMARY

The present disclosure provides a method for generating an image label and a device.

According to a first aspect, a method for generating an image label is provided. The method includes:
  acquiring a target image whose label is to be generated;
  acquiring a partial image of the target image;
  acquiring a plurality of features based on the target image and the partial image, wherein the plurality of features includes: a first feature of the target image, and a second feature of the partial image; and
  generating a first-type image label of the target image based on the acquired first feature and second feature.

Optionally, acquiring the partial image of the target image includes:
  acquiring a plurality of partial images of the target image in different sizes, the plurality of partial images including the same region of the target image.

Optionally, before acquiring the plurality of features based on the target image and the partial image, the method further includes:
  updating the partial image by adjusting a size of the partial image to be a size of the target image.

Optionally, acquiring the plurality of features based on the target image and the partial image includes:
  inputting the target image into a first feature extracting network;
  acquiring the first feature output by the first feature extracting network;
  inputting the partial image into a second feature extracting network; and
  acquiring the second feature of the partial image output by the second feature extracting network.

Optionally, the first feature extracting network includes an intermediate level and an output level, the intermediate level being configured to output an intermediate layer feature, the output level being configured to output the first feature, the intermediate layer feature and the first feature have different dimensions, and the plurality of features further including the intermediate layer feature; and the method further includes:
  generating a second-type image label of the target image based on the intermediate layer feature and the first feature.

Optionally, generating the second-type image label of the target image based on the intermediate layer feature and the first feature includes:
  acquiring a fused feature based on the intermediate layer feature and the first feature; and
  generating the second-type image label based on the fused feature.

Optionally, acquiring the fused feature based on the intermediate layer feature and the first feature includes:
  inputting the intermediate layer feature and the first feature into a target feature fusing network; and
  acquiring the fused feature output by the target feature fusing network.

Optionally, the first feature extracting network includes: n intermediate levels and one output level, wherein n>2, an $n^{th}$ intermediate level is connected to the output level, the intermediate level includes a convolutional layer and a pooling layer, different intermediate levels output intermediate layer features of different dimensions respectively, and the output level includes a pooling layer and a fully connected layer;
  the target feature fusing network includes: a first-type convolutional layer and n second-type convolutional layers, wherein the first-type convolutional layer is configured to perform convolutional processing on the first feature, an $i^{th}$ second-type convolutional layer is configured to perform convolutional processing on an intermediate layer feature output by an $(n+1-i)^{th}$ intermediate level, and $1 \leq i \leq n$;
  the target feature fusing network further includes: a first-type up-sampling layer and n−2 second-type up-sampling layers, wherein the first-type up-sampling layer is configured to perform up-sampling on a convolutional feature output by the first-type convolutional layer and a convolutional feature output by a first second-type convolutional layer; a $j^{th}$ second-type up-sampling layer is configured to perform up-sampling on an up-sampling feature output by a previous up-sampling layer and a convolutional feature output by a $(j+1)^{th}$ second-type up-sampling layer, where $1 \leq j \leq n-2$; when j=1, the previous up-sampling layer is the first-type up-sampling layer; and when j>1, the previous up-sampling layer is a $(j-1)^{th}$ second-type up-sampling layer; and
  the fused feature output by the target feature fusing network is a feature added up by an up-sampling feature output by an $(n-2)^{th}$ second-type up-sampling layer and a convolutional feature output by an $n^{th}$ second-type convolutional layer.

Optionally, generating the first-type image label of the target image based on the first feature and the second feature includes:
  inputting the acquired first feature and second feature into a first target label recognizing network; and
  acquiring the first-type image label output by the first target label recognizing network;
  generating the second-type image label based on the fused feature includes:
  inputting the fused feature into a second target label recognizing network; and
  acquiring the second-type image label output by the second target label recognizing network.

Optionally, the method meets at least one of the following conditions:
the first target label recognizing network is configured to output the first-type image label based on the input first feature and second feature and first information in the second target label recognizing network; and
the second target label recognizing network is configured to output the second-type image label based on the input fused feature and second information in the first target label recognizing network.

Optionally, the first target label recognizing network includes a first time recurrent neural network; the first information includes information output by the first time recurrent neural network;
the second target label recognizing network includes a second time recurrent neural network; the second information includes information output by the second time recurrent neural network.

Optionally, the second-type image label includes a plurality of sub-type image labels.

Optionally, the method further includes:
inputting the fused feature into a third target label recognizing network; and
acquiring a third-type image label of the target image output by the third target label recognizing network.

Optionally, the target image is a painting image; the first-type image label is a category label of the target image; and in the first-type image label and the second-type image label, one of them includes a subject label of the target image, and the other one thereof includes a content label of the target image.

Optionally, generating the first-type image label of the target image based on the first feature and the second feature includes:
inputting the acquired first feature and second feature into a first target label recognizing network; and
acquiring the first-type image label output by the first target label recognizing network;
generating the second-type image label based on the fused feature includes:
inputting the fused feature into a second target label recognizing network; and
acquiring the second-type image label output by the second target label recognizing network;
before acquiring the plurality of features based on the target image and the partial image, the method further includes:
acquiring a first sample set, a second sample set and a third sample set, wherein the first sample set includes a first-type sample image and a label thereof; the second sample set includes a second-type sample image and a label thereof; and the third sample set includes a third-type sample image, the first-type image label and the second-type image label;
acquiring an intermediate feature extracting network by training an initial feature extracting network using the first sample set;
acquiring an intermediate feature fusing network by training an initial feature fusing network using the second sample set; and
acquiring a neural network model by training a to-be-trained neural network using the third sample set,
wherein the to-be-trained neural network includes the intermediate feature extracting network, the intermediate feature fusing network, a first initial label recognizing network and a second initial label recognizing network;
the neural network model includes a target feature extracting network, the target feature fusing network, the first target label recognizing network and the second target label recognizing network;
the target feature extracting network is acquired by training the intermediate feature extracting network, and includes the first feature extracting network and the second feature extracting network; the first target label recognizing network is acquired by training the first initial label recognizing network, and the second target label recognizing network is acquired by training the second initial label recognizing network.

Optionally, before acquiring the neural network model by training the to-be-trained neural network using the third sample set, the method further includes:
updating the intermediate feature extracting network and the intermediate feature fusing network by training the intermediate feature extracting network and the intermediate feature fusing network using the third sample set.

Optionally, the target image is a painting image, the first-type sample image and the second-type sample image are non-painting images, and the third-type sample image is the painting image.

Optionally, the target image is a painting image, the first-type sample image and the second-type sample image are non-painting images, and the third-type sample image is the painting image;
acquiring the partial image of the target image includes:
acquiring a plurality of partial images of the target image in different sizes, the plurality of partial images including the same region of the target image;
before acquiring the plurality of features based on the target image and the partial image, the method further includes: updating the partial image by adjusting a size of the partial image to be a size of the target image;
acquiring the fused feature based on the intermediate layer feature and the first feature includes: inputting the intermediate layer feature and the first feature into a target feature fusing network; and acquiring the fused feature output by the target feature fusing network;
the first feature extracting network includes: n intermediate levels and one output level, wherein n>2, an $n^{th}$ intermediate level is connected to the output level, the intermediate level includes a convolutional layer and a pooling layer, different intermediate levels output intermediate layer features of different dimensions respectively, and the output level includes a pooling layer and a fully connected layer;
the target feature fusing network includes: a first-type convolutional layer and n second-type convolutional layers, wherein the first-type convolutional layer is configured to perform convolutional processing on the first feature, an $i^{th}$ second-type convolutional layer is configured to perform convolutional processing on an intermediate layer feature output by an $(n+1-i)^{th}$ intermediate level, and $1 \leq i \leq n$; the target feature fusing network further includes: a first-type up-sampling layer and n−2 second-type up-sampling layers, wherein the first-type up-sampling layer is configured to perform up-sampling on a convolutional feature output by the first-type convolutional layer and a convolutional feature output by a first second-type convolutional layer; a $i^{th}$ second-type up-sampling layer is configured to perform up-sampling on an up-sampling feature output by a previous up-sampling layer and a convolutional feature output by a $(j+1)^{th}$ second-type up-sampling layer, where 1≤j≤n−2; when j=1, the previous up-sampling layer is the first-type up-sampling layer; and when j>1, the previous up-sampling layer is a (j−1)$^{th}$ second-type up-sampling layer; and the fused feature output by the target feature fusing network is a feature added up by an up-sampling feature output by an (n−2)$^{th}$ second-type up-sampling layer and a convolutional feature output by an n$^{th}$ second-type convolutional layer;

the first target label recognizing network is configured to output the first-type image label based on the input first feature and second feature and information output by a second time recurrent neural network in the second target label recognizing network; and the second target label recognizing network is configured to output the second-type image label based on the input fused feature and information output by a first time recurrent neural network in the first target label recognizing network;

the target image is a painting image; the first-type image label is a category label of the target image; the second-type image label includes a subject label of the target image and a content label of the target image.

A second aspect provides an electronic device, which includes a processor and a memory, wherein the memory is configured to store a computer program; and the processor is configured to realize the method according to claim 1 when executing the program stored in the memory.

A third aspect provides a computer-readable storage medium storing a computer program thereon, wherein when the program is executed by a processor, the method according to the first aspect is realized.

DETAILED DESCRIPTION

The technical solutions in the embodiments of the present invention are clearly and completely described below with reference to the accompanying drawings in the embodiments of the present disclosure. Obviously, the embodiments described are merely some but not all embodiments of the present disclosure. Based on the embodiments of the present disclosure, all other embodiments derived by a person of ordinary skill in the art without creative efforts shall fall within the protection scope of the present disclosure.

Some embodiments of the present disclosure provide a method for generating an image label and a device. The method is applicable to various electronic devices, which is not limited in the present disclosure. The method for generating the image label is firstly introduced in detail below. The respective steps in the following method embodiments are executed in a logical order, and the step numbers or the order of introducing the respective steps may not constitute a limitation to the execution order of the respective steps.

Figure 1:
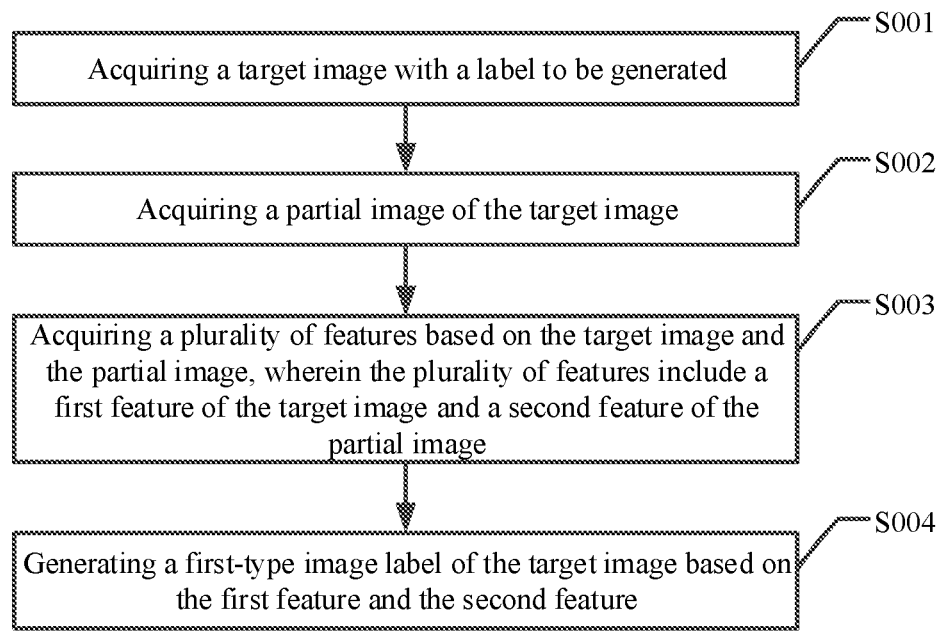
FIG. 1 is a first flowchart of a method for generating an image label according to an embodiment of the present disclosure.

FIG. 1 is a first flowchart of a method for generating an image label according to an embodiment of the present disclosure. The method for generating the image label is applicable to an electronic device. As shown in FIG. 1, the method for generating the image label includes the following steps.

In S001, a target image with a label to be generated is acquired.

For example, the target image may be a painting image, a photographic image, a snapshot image, a video image, or the like, and the category of the image is not limited in the present disclosure.

In S002, a partial image of the target image is acquired.

In an exemplary embodiment, the electronic device may acquire the partial image by cropping the target image. The partial image includes a partial region of the target image, the target image includes global information of the target image, and the partial image includes partial information of the target image.

Optionally, the electronic device may acquire one or more partial images of the target image. When the electronic device acquires a plurality of partial images of the target image, the plurality of partial images have different sizes and include a same region of the target image.

In an exemplary embodiment, the electronic device may acquire one partial image by cropping the target image firstly; the electronic device then acquire another partial image by cropping the previous partial image; afterwards, the electronic device acquires a new partial image by cropping the previous another partial image; and in this way, the electronic device may acquire the plurality of partial images.

When the electronic device acquires the plurality of partial images of the target image, the plurality of partial images may also include different regions of the target image. At this time, the plurality of partial images may have the same size or different sizes, which is not limited in the present disclosure.

In S003, a plurality of features are acquired based on the target image and the partial image, wherein the plurality of features include a first feature of the target image, and a second feature of the acquired partial image.

After acquiring the target image and the partial image, the electronic device may acquire the first feature of the target image, and the second feature of the partial image.

Optionally, the electronic device may acquire the first feature of the target image and the second feature of the partial image in the same way. At this time, prior to acquiring the second feature, the electronic device may update the partial image by adjusting the size of the partial image to be the size of the target image. The electronic device then acquires the second feature of the partial image (the updated partial image). In an exemplary embodiment, the electronic device may adjust the size of the partial image in any way. For example, the electronic device may perform bi-linear interpolation processing on the partial image so as to adjust the size of the partial image to be the size of the target image.

Of course, the electronic device may also acquire the first feature of the target image and the second feature of the partial image in different ways. At this time, it may be unnecessary for the electronic device to adjust the size of the partial image, which is not limited in the embodiment of the present disclosure.

In an exemplary embodiment, when acquiring the first feature of the target image, the electronic device may input the target image into a first feature extracting network, and acquire the first feature output by the first feature extracting network. When acquiring the second feature of the partial image, the electronic device may input the partial image into a second feature extracting network, and acquire the second feature output by the second feature extracting network.

In S004, a first-type image label of the target image is generated based on the first feature and the second feature.

After acquiring the first feature and the second feature, the electronic device may generate the first-type image label of the target image based on these features. As the first feature is related to the target image, the first feature is related to the global information of the target image. As the second feature is related to the partial image, the second feature is related to the partial information of the target image. Since the features (the first feature and the second feature) based on which, the electronic device generates the first-type image label, are related to both the global information and the partial information of the target image, the first-type image label generated by the electronic device is relatively accurate, thereby avoiding the situation that the label of the target image generated by the electronic device based on the first feature only is relatively low in accuracy.

In an exemplary embodiment, the electronic device may input the first feature and the second feature into a first target label recognizing network, and acquire the first-type image label of the target image output by the first target label recognizing network.

Figure 2:
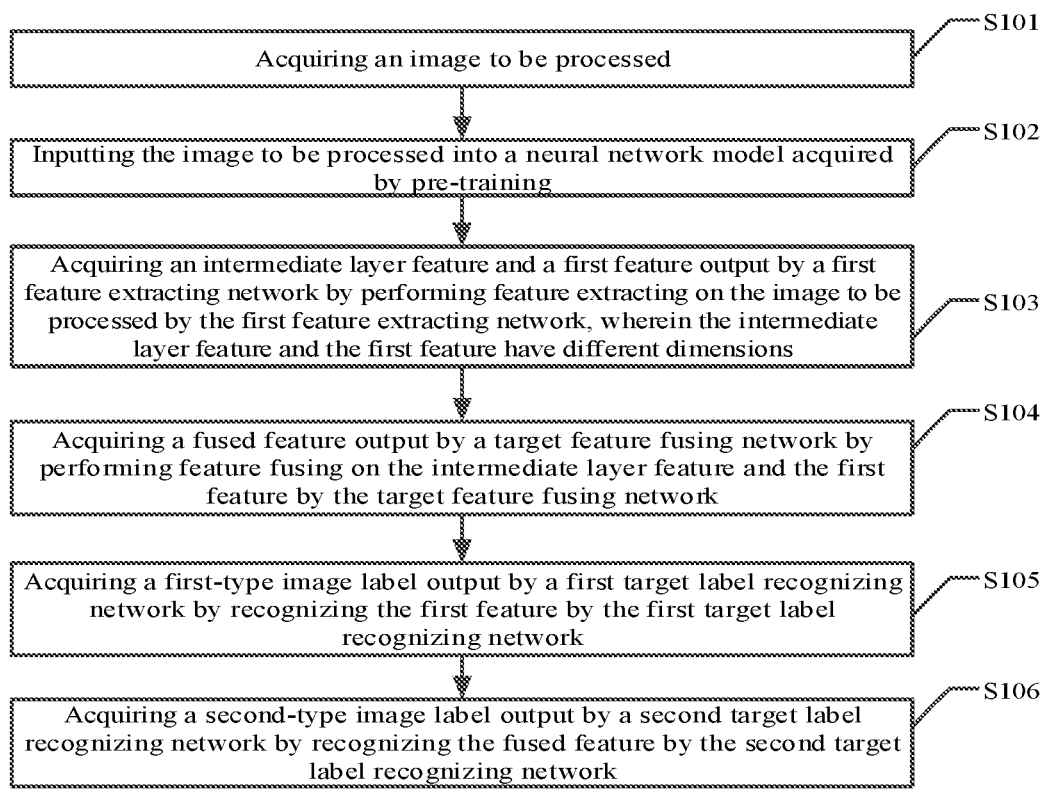
FIG. 2 is a second flowchart of a method for generating an image label according to an embodiment of the present disclosure.

FIG. 2 is a second flowchart of a method for generating an image label according to an embodiment of the present disclosure. As shown in FIG. 2, the method for generating the image label includes the following steps.

In S101, an image to be processed is acquired.

For example, the image to be processed includes a target image which may be a painting image. This solution may generate a plurality of labels of the painting image. Or the target image may be a photographic image, a snapshot image, a video image, or the like, and the category of the image is not limited.

In S102, the image to be processed is input into a neural network model acquired by pre-training.

Figure 3:
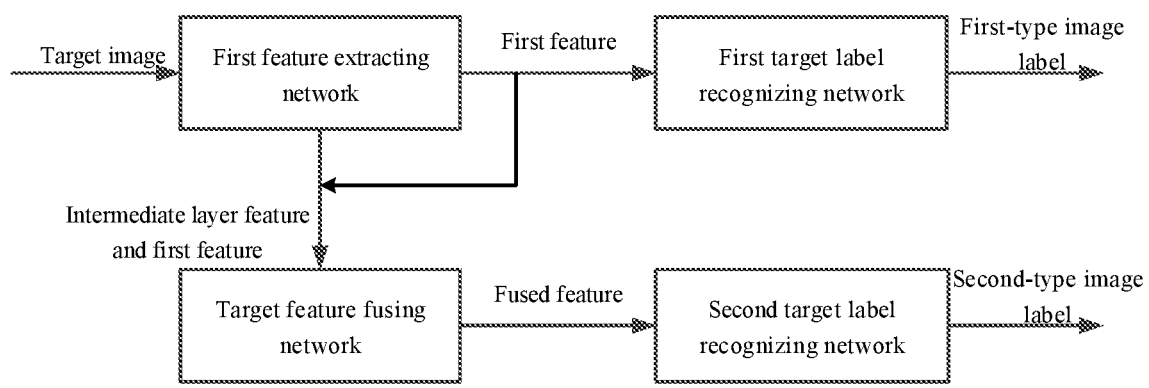
FIG. 3 is a first structural schematic diagram of a neural network model according to an embodiment of the present disclosure.

The structure of the neural network model may be seen with reference to FIG. 3. The neural network model includes a first feature extracting network, a first target label recognizing network and a target feature fusing network which are connected to the first feature extracting network, and a second target label recognizing network connected to the target feature fusing network.

The neural network model is configured to output a first-type image label and a second-type image label. The neural network model is a model acquired by training a neural network of a preset structure based on a sample image, the first-type image label, and the second-type image label thereof.

In S103, an intermediate layer feature and a first feature output by the first feature extracting network are acquired by performing feature extracting on the image to be processed by the first feature extracting network, wherein the intermediate layer feature and the first feature have different dimensions.

It should be noted that the first feature extracting network includes an intermediate level and an output level, wherein the intermediate level is configured to output the intermediate layer feature, and the output level is configured to output the first feature.

With continued reference to FIG. 3, the input of the first feature extracting network is the image to be processed (the target image) and the output thereof is the intermediate layer feature and the first feature.

In some embodiments, the first feature extracting network may be a main part of a visual geometry group (VGG)-16 network and may include a convolutional layer, a pooling layer and a fully connected layer.

Figure 4:
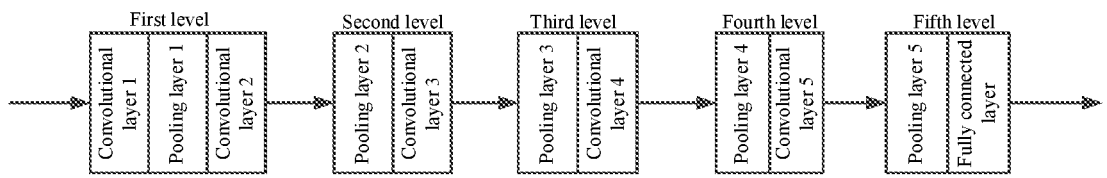
FIG. 4 is a structural schematic diagram of a first feature extracting network according to an embodiment of the present disclosure.

With reference to FIG. 4, the first feature extracting network may include a plurality of levels. A first level may include a convolutional layer 1, a pooling layer 1 and a convolutional layer 2. A second level may include a pooling layer 2 and a convolutional layer 3. A third level may include a pooling layer 3 and a convolutional layer 4. A fourth level may include a pooling layer 4 and a convolutional layer 5. A fifth level may include a pooling layer 5 and a fully connected layer. All these levels may output image features. For distinguishing description, the image features output by the first level to the fourth level are called the intermediate layer feature, and the image feature output by the fifth level is called the first feature.

The image features output by respective levels have different dimensions, and the dimension here may be understood as the resolution of the image. The dimensions of the image features output by the respective levels become smaller and smaller. That is, the dimension of the image feature output by the second level is less than the dimension of the image feature output by the first level, the dimension of the image feature output by the third level is less than the dimension of the image feature output by the second level, it may be deduced by analog and are not repeated here. The image contents corresponding to the image features output by the respective levels become more and more detailed.

In other embodiments, the first feature extracting network of a different structure from the main part of the VGG-16 network may be adopted. The first feature extracting network is mainly configured to perform feature extracting on the image, and the network structure and the network form of the first feature extracting network are not limited.

In S104, a fused feature output by the target feature fusing network is acquired by performing feature fusing on the intermediate layer feature and the first feature by the target feature fusing network.

Figure 5:
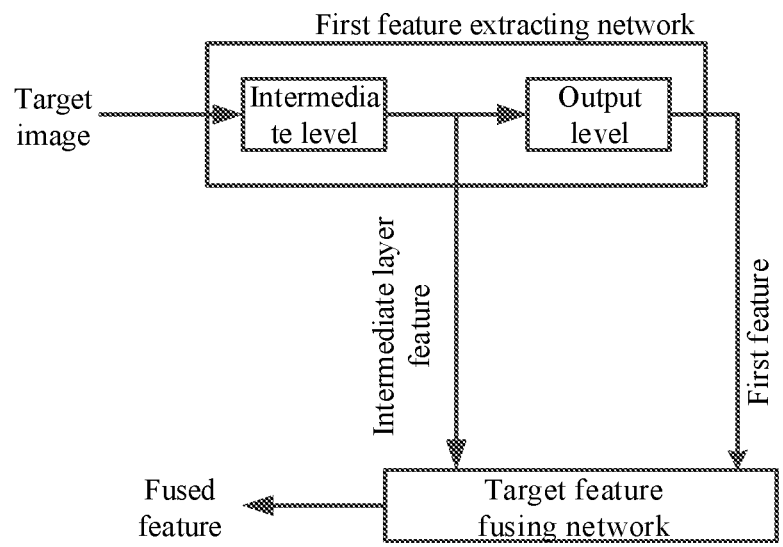
FIG. 5 is a structural schematic diagram of a first feature extracting network and a target feature fusing network according to an embodiment of the present disclosure.

With continued reference to FIG. 3, the input of the target feature fusing network is the intermediate layer feature and the first feature output by the first feature extracting network. With reference to FIG. 5, the first feature extracting network may include one or more intermediate levels and one output level. For distinguishing description, the image features output by the intermediate levels are called the intermediate layer feature, and the image feature output by the output level is called the first feature. The electronic device may input the intermediate layer feature and the first feature output by the first feature extracting network into the target feature fusing network and acquire the fused feature output by the target feature fusing network.

As described above, the image features output by the different levels in the first feature extracting network have different dimensions. The target feature fusing network may be understood as a network for fusing image features of different dimensions. The fused feature includes fine granularity information and overall image information.

In S105, the first-type image label output by the first target label recognizing network is acquired by recognizing the first feature by the first target label recognizing network.

With continued reference to FIG. 3, the first feature output by the first feature extracting network enters the first target label recognizing network and the output of the target label recognizing network is the first-type image label.

Figure 6:
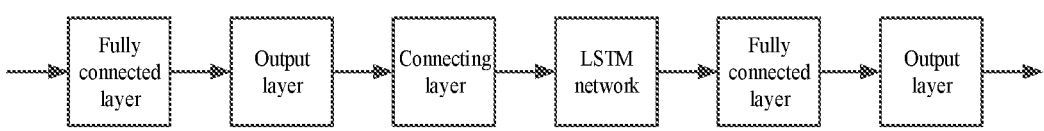
FIG. 6 is a structural schematic diagram of a first target label recognizing network according to an embodiment of the present disclosure.

For example, the first target label recognizing network may include a fully connected layer, an output layer, a connecting layer, a long short-term memory (LSTM) network, and the like. In some embodiments, with reference to FIG. 6, the first target label recognizing network includes a fully connected layer, an output layer (this output layer may take a softmax function as a loss function), a connecting layer, an LSTM network, a fully connected layer and an output layer (this output layer may take the softmax function as the loss function), which are connected in sequence. FIG. 6 is given for illustration only, and does not constitute a limitation to the specific structure of the first target label recognizing network.

The LSTM network in the first target label recognizing network may also be replaced with other time recurrent neural networks. The above loss function may also be other loss functions in addition to the softmax function, and the type of the loss function is not limited. It may be understood that when the first target label recognizing network is trained, it needs to determine whether the network is converged with the loss function, but after the training is completed, it is unnecessary to use the loss function again when label recognizing is performed with the first target label recognizing network.

In the above case, the target image is the painting image. In this case, the first-type image label may be a category label of the painting image, such as Chinese painting, oil painting, sketching, gouache, and watercolor.

In some embodiments, in S105, the first target label recognizing network may output a plurality of first-type image labels and confidence of each first-type image label. In these embodiments, a related person may take the first-type image label with the highest confidence as the first-type image label finally determined; or the electronic device may also set a confidence threshold, and take the first-type image label having higher confidence than the confidence threshold as the first-type image label finally determined. Or in other embodiments, the first target label recognizing network may also output one first-type image label finally determined, and data output by the first target label recognizing network is not limited.

In S106, the second-type image label output by the second target label recognizing network is acquired by recognizing the fused feature by the second target label recognizing network.

With continued reference to FIG. 3, the input of the second target label recognizing network is the fused feature output by the target feature fusing network and the output of the second target label recognizing network is the second-type image label.

Figure 7:
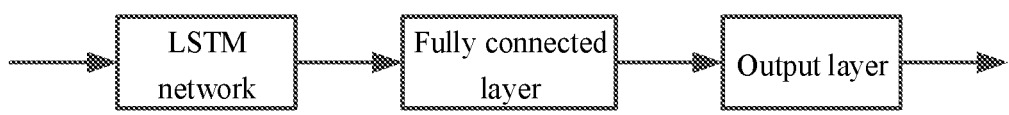
FIG. 7 is a structural schematic diagram of a second target label recognizing network according to an embodiment of the present disclosure.

For example, the second target label recognizing network may include an LSTM network, a fully connected layer, an output layer, and the like. In some embodiments, with reference to FIG. 7, the second target label recognizing network may include an LSTM network, a fully connected layer, and an output layer (this output layer may take a sigmoid function as a loss function), which are connected in sequence. It may be understood that when the second target label recognizing network is trained, it needs to determine whether the second target label recognizing network is converged with the loss function, but after the training is completed, it is unnecessary to use the loss function again when label recognizing is performed with the second target label recognizing network. FIG. 7 is given for illustration only and does not constitute a limitation to the structure of the second target label recognizing network.

The LSTM network in the second target label recognizing network is suitable for processing information with relatively long intervals and delays in time series and may also be replaced with other time recurrent neural networks. The second target label recognizing network may also use other loss functions in addition to the sigmoid function, and the type of the loss function is not limited.

In the above case, the target image is the painting image. In this case, the second-type image label may include a plurality of sub-type image labels. For example, the second-type image label may include a subject label (one sub-type image label) of the painting image, such as landscape, people, and animals. The second-type image label may also include a content label (another sub-type image label), such as sky, house, mountain, water and horse. The second-type image label may also include one sub-type image label, which is not limited in the present disclosure.

In some embodiments, in S106, the second target label recognizing network may output a plurality of second-type image labels and confidence of each second-type image label. In these embodiments, a related person may take the second-type image label with the highest confidence as the second-type image label finally determined; or the electronic device may also set a confidence threshold, and take the second-type image label having confidence higher than the confidence threshold as the second-type image label finally determined. Or in other embodiments, the second target label recognizing network may also output one second-type image label finally determined, and data output by the second target label recognizing network is not limited.

It may be seen that the first feature extracting network includes the intermediate level and the output level. The intermediate level is configured to output the intermediate layer feature, and the output level is configured to output the first feature of the target image. At this time, the plurality of features acquired by the electronic device based on the target image and the partial image not only include the first feature and the second feature above, but also include the intermediate layer feature, and the dimension of the intermediate layer feature is different from that of the first feature.

In this case, the electronic device may generate the second-type image label of the target image based on the intermediate layer feature and the first feature. For example, the electronic device may acquire the fused feature based on the intermediate layer feature and the first feature, and then generate the second-type image label based on the fused feature. When acquiring the fused feature based on the intermediate layer feature and the first feature, the electronic device may input the intermediate layer feature and the first feature into the target feature fusing network and then acquire the fused feature output by the target feature fusing network. When generating the second-type image label based on the fused feature, the electronic device may input the fused feature into the second target label recognizing network and then acquire the second-type image label output by the second target label recognizing network.

Optionally, the electronic device may also acquire the first feature without using the above first feature extracting network; the electronic device may also acquire the second feature without using the above second feature extracting network; the electronic device may also acquire the fused feature without using the above target feature fusing network; the electronic device may acquire the above second-type image label based on the intermediate layer feature and the first feature, without acquiring the fused feature based on the intermediate layer feature and the first feature; and the electronic device may also recognize the above first-type image label and second-type image label without using the label recognizing networks, which is not limited in the present disclosure.

By adopting the embodiment shown in FIG. 2, in a first aspect, the same neural network model can output a plurality of labels of the image and thus a solution that the plurality of labels of the image can be generated is provided. In a second aspect, the target feature fusing network fuses the image features of different dimensions and the fused feature includes both the fine granularity information and the overall image information, thereby further improving the accuracy of label recognizing.

Figure 8:
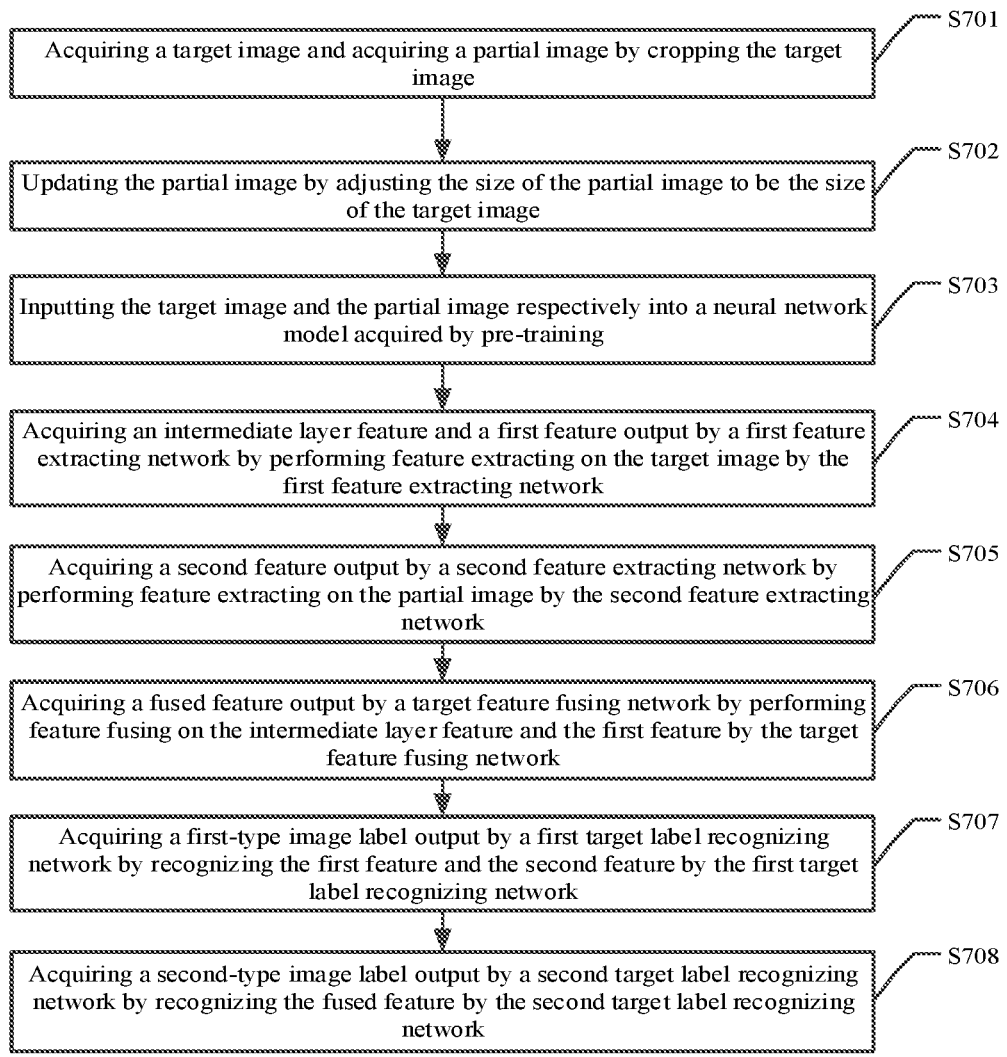
FIG. 8 is a third flowchart of a method for generating an image label according to an embodiment of the present disclosure.

FIG. 8 is a third flowchart of a method for generating an image label according to an embodiment of the present disclosure. As shown in FIG. 8, the method for generating the image label includes the following steps.

In S701, a target image is acquired and a partial image is acquired by cropping the target image.

In the embodiment shown in FIG. 8, an image to be processed may include the entire target image and the partial image acquired by cropping the target image. In this way, Both global information and partial information of the target image may be considered.

In S702, the partial image is updated by adjusting the size of the partial image to be the size of the target image.

For example, the size of the partial image may be adjusted to be identical to the size of the target image by a bi-linear interpolation algorithm, or the partial image may be magnified until the size of the partial image is identical to the size of the target image. A specific size adjusting mode is not limited.

In some embodiments, the partial image may further be cropped out another partial image, and then the size of the another partial image is adjusted. In this way, the partial information may be further magnified. By taking a painting image as an example, with reference to FIG. 9, a partial image corresponding to a region A is acquired by cropping the target image. Then a partial image corresponding to a region A1 is acquired by cropping the partial image corresponding to the region A. A plurality of images have the identical size are acquired by performing bi-linear interpolation processing on these partial images. The plurality of images are input into a neural network model as images to be processed.

In S703, the target image and the partial image are respectively input into a neural network model acquired by pre-training.

Figure 10:
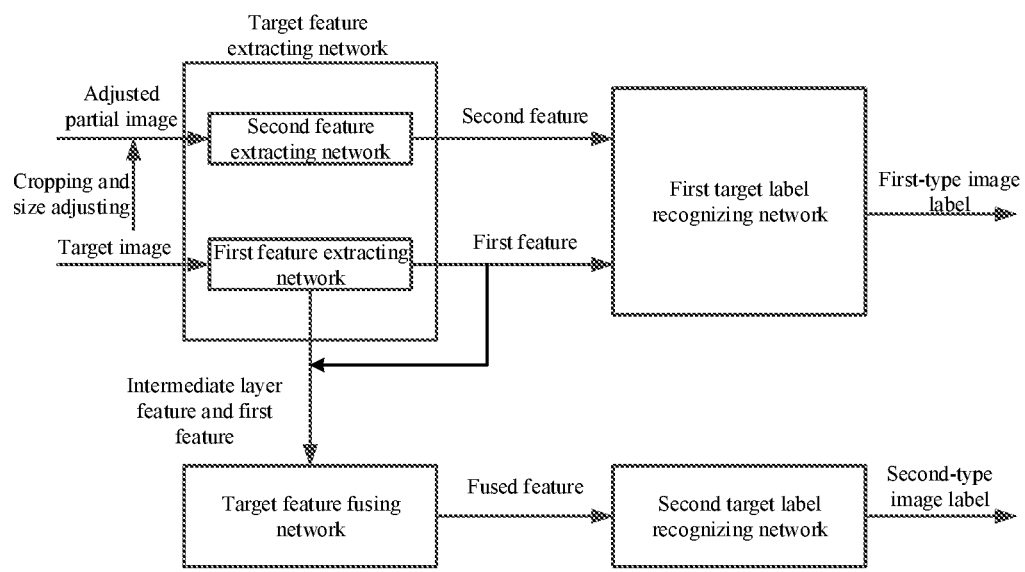
FIG. 10 is a second structural schematic diagram of a neural network model according to an embodiment of the present disclosure.

The structure of the neural network model may be seen with reference to FIG. 10. The neural network model includes a target feature extracting network, a first target label recognizing network and a target feature fusing network which are connected to the target feature extracting network, a second target label recognizing network connected to the target feature fusing network. The target feature extracting network includes a first feature extracting network and a second feature extracting network. The neural network model is acquired by training a neural network of a preset structure based on a sample image and a first-type image label and a second-type image label thereof. The process of acquiring the neural network model by training is introduced in detail later.

As described above, the partial image may further be cropped out another partial image. In this way, images of a plurality levels (including the target image and the respective partial images) are acquired. The image of each level corresponds to one sub-network in the target feature extracting network. The above first feature extracting network and second feature extracting network are two sub-networks in the target feature extracting network. The size of the partial image of each level is adjusted and the target image and the partial image of each level (the partial image whose size is adjusted) are respectively input into the corresponding sub-networks in the target feature extracting network. For example, the target image is input into the first feature extracting network and the partial image is input into the second feature extracting network. The number of levels of the partial images is not limited and correspondingly, the number of sub-networks in the target feature extracting network is not limited, either. Each sub-network in the target feature extracting network may adopt the structure of the VGG-16 network shown in FIG. 4. The network structures of the respective sub-networks may be same, or may be different. The network structure is not limited as long as the sub-network plays the effect of feature extracting.

For distinguishing description, the sub-network corresponding to the target image is called the first feature extracting network and the sub-network corresponding to the partial image is called the second feature extracting network. Or the target image is input into the first feature extracting network and the partial images (the partial image whose size is adjusted and the updated partial image) are input into the second feature extracting network.

In S704, an intermediate layer feature and a first feature output by the first feature extracting network are acquired by performing feature extracting on the target image by the first feature extracting network.

In S705, the second feature output by the second feature extracting network is acquired by performing feature extracting on the partial image by the second feature extracting network.

With continued reference to FIG. 10, the input of the first feature extracting network is the target image and the output thereof is the intermediate layer feature and the first feature.

The input of the second feature extracting network is the adjusted partial image (updated partial image) and the output thereof is the second feature.

In S706, the fused feature output by the target feature fusing network is acquired by performing feature fusing on the intermediate layer feature and the first feature by the target feature fusing network.

In some embodiments, the first feature extracting network includes a plurality of levels including n intermediate levels and one output level, wherein n>2, and an $n^{th}$ intermediate level is connected to the output level. Each intermediate level includes a convolutional layer and a pooling layer, different intermediate levels output intermediate layer features of different dimensions respectively, and the output level includes a pooling layer and a fully connected layer and outputs the first feature.

The target feature fusing network includes n+1 convolutional layers, which are divided into a first-type convolutional layer and n second-type convolutional layers. The first-type convolutional layer is configured to perform convolutional processing on the first feature, an $i^{th}$ second-type convolutional layer is configured to perform convolutional processing on an intermediate layer feature output by an $(n+1-i)^{th}$ intermediate level, and 1≤i≤n.

When n>1, the target feature fusing network further includes n−1 up-sampling layers which are sequentially connected. The n−1 up-sampling layers include: a first-type up-sampling layer and n−2 second-type up-sampling layers. The first-type up-sampling layer is configured to perform up-sampling on a convolutional feature output by the first-type convolutional layer and a convolutional feature output by the second-type convolutional layer (the first second-type convolutional layer) adjacent to the first-type convolutional layer. A $j^{th}$ second-type up-sampling layer is configured to perform up-sampling on an up-sampling feature output by a previous up-sampling layer and a convolutional feature output by a $(j+1)^{th}$ second-type convolutional layer, where 1≤j≤n−2. When j=1, the previous up-sampling layer is the first-type up-sampling layer; and when j>1, the previous up-sampling layer is a $(j-1)^{th}$ second-type up-sampling layer. The fused feature output by the target feature fusing network is a feature added up by an up-sampling feature output by the last up-sampling layer (i.e., an $(n-2)^{th}$ second-type up-sampling layer) and a convolutional feature output by a second-type convolutional layer (an $n^{th}$ second-type convolutional layer).

Figure 11:
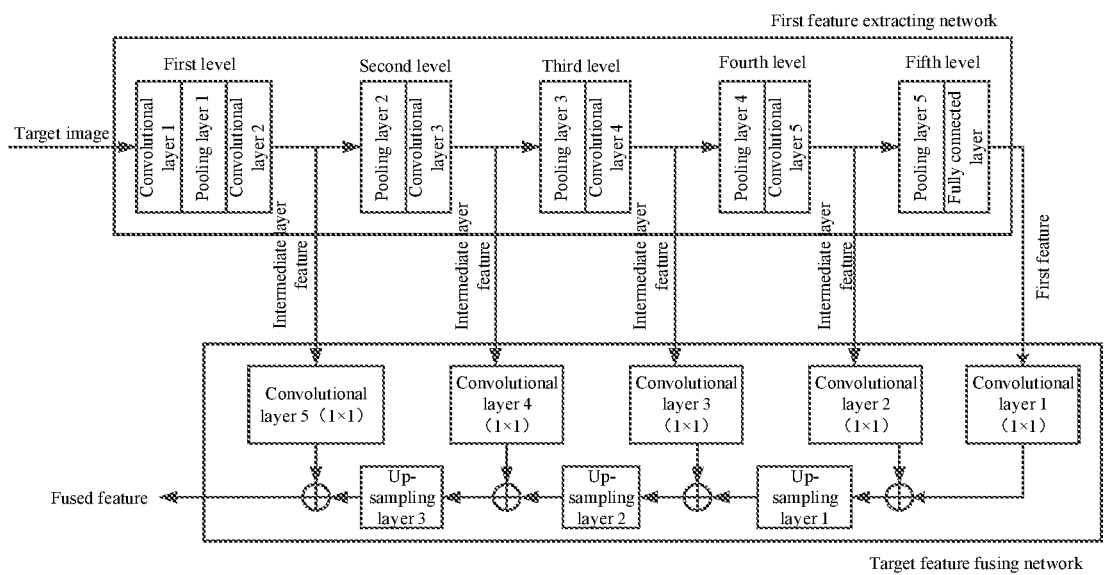
FIG. 11 is another structural schematic diagram of a first feature extracting network and the target feature fusing network according to an embodiment of the present disclosure.

This embodiment is explained below with reference to FIG. 11. The first feature extracting network in FIG. 11 adopts the structure of the VGG-16 network shown in FIG. 4. In this embodiment, the target feature extracting network includes a plurality of sub-networks. FIG. 11 mainly shows the structure of the first feature extracting network which includes four intermediate levels (a first level, a second level, a third level and a fourth level) and one output level (a fifth level). Each intermediate level includes a convolutional layer and a pooling layer, and the output level includes a pooling layer and a fully connected layer. The first level includes a convolutional layer 1, a pooling layer 1, and a convolutional layer 2. The second level includes a pooling layer 2 and a convolutional layer 3. The third level includes a pooling layer 3 and a convolutional layer 4. The fourth level includes a pooling layer 4 and a convolutional layer 5. The fifth level includes a pooling layer 5 and a fully-connected layer.

The target feature fusing network includes five convolutional layers, and three up-sampling layers which are sequentially connected.

The convolutional layer is explained firstly. In the target feature fusing network, the convolutional layer 1 is the first-type convolutional layer and the convolutional layer 2, the convolutional layer 3, the convolutional layer 4 and the convolutional layer 5 are the second-type convolutional layers. The first-type convolutional layer is configured to perform convolutional processing on the first feature, and each second-type convolutional layer is configured to perform convolutional processing on the intermediate layer feature output by one intermediate level.

The up-sampling layer is then explained: the up-sampling layer 1 in the target feature fusing network is the first-type up-sampling layer and the up-sampling layer 2 and the up-sampling layer 3 in the target feature fusing network are the second-type up-sampling layers. The first-type up-sampling layer is configured to perform up-sampling on a convolutional feature added up by a convolutional feature output by the first-type convolutional layer (the convolutional layer 1) and a convolutional feature output by the second-type convolutional layer (the convolutional layer 2) adjacent to the first-type convolutional layer; the up-sampling layer 2 is configured to perform up-sampling on a convolutional feature added up by an up-sampling feature output by the up-sampling layer 1 and a convolutional feature output by the convolutional layer 3; the up-sampling layer 3 is configured to perform up-sampling on a convolutional feature added up by an up-sampling feature output by the up-sampling layer 2 and a convolutional feature output by the convolutional layer 4; and a feature added up by an up-sampling feature output by the up-sampling layer 3 and a convolutional feature output by the convolutional layer 5 is output data (the fused feature) of the target feature fusing network.

In S707, a first-type image label output by the first target label recognizing network is acquired by recognizing the first feature and the second feature by the first target label recognizing network.

In S708, a second-type image label output by the second target label recognizing network is acquired by recognizing the fused feature by the second target label recognizing network.

The target feature extracting network, the target feature fusing network, the first target label recognizing network, and the second target label recognizing network are introduced in detail in the embodiment shown in FIG. 2 and are not repeated here.

By adopting the embodiment shown in FIG. 8 of the present disclosure, the input of the neural network model includes both the entire image and the partial region of the entire image. In this way, the global information and partial information of the image are considered.

By taking the painting image as an example again, it is relatively difficult to recognize the category label of the painting image or in other words, the accuracy of label recognizing is relatively low. For example, some oil painting images are easily confused with some gouache images, and the accuracy of recognizing category labels of these two kinds of painting images is relatively low.

By using the embodiment shown in FIG. 8 of the present disclosure, the input of the neural network model includes the partial region of the entire image, and this partial region magnifies the detail information of the painting image, and may reflect the detail features of the image, such as brushstroke features. The oil painting images may be distinguished from the gouache images based on the brushstroke features. Therefore, this solution improves the accuracy of label recognizing.

Optionally, the method according to the present disclosure meets at least one of the following conditions:

the first target label recognizing network is configured to output the first-type image label based on the first feature, the second feature, and first information in the second target label recognizing network; and the second target label recognizing network is configured to output the second-type image label based on the fused feature and second information in the first target label recognizing network.

Based on the above two conditions, it can be seen that at least one of the first target label recognizing network and the second target label recognizing network may output the image label based on the information in the other network. In this way, the at least one network may learn a semantic correlation between different types of labels and thus the accuracy of label recognizing may be improved by using the semantic correlation between the labels.

In an exemplary embodiment, the first target label recognizing network includes a first time recurrent neural network; the first information includes information output by the first time recurrent neural network; the second target label recognizing network includes a second time recurrent neural network; and the second information includes information output by the second time recurrent neural network. Optionally, at least one of the first time recurrent neural network and the second time recurrent neural network is the LSTM network. For example, in some embodiments, the first target label recognizing network includes a first LSTM network and the second target label recognizing network includes a second LSTM network.

The input of the first LSTM network includes the state information of the second LSTM network, and the state information of the second LSTM network is used by the first LSTM network to learn the semantic correlation of image labels between the first LSTM network and the second LSTM network.

Or the input of the second LSTM network includes the state information of the first LSTM network, and the state information of the first LSTM network is used by the second LSTM network to learn the semantic correlation of image labels between the first LSTM network and the second LSTM network.

As described above, each of the first target label recognizing networks and the second target label recognizing network includes the LSTM network. For distinguishing description, the LSTM network in the first target label recognizing network is called the first LSTM network and the LSTM network in the second target label recognizing network is called the second LSTM network.

The input of the LSTM network usually includes the following three kinds of data: an input value $x\_t$ of the LSTM network at a current moment, an output value $h\_t-1$ of the LSTM at a previous moment, and the state information $c\_t-1$ of the LSTM at the previous moment. The output of the LSTM network usually includes the following two kinds of data: an output value $h\_t$ of the LSTM at the current moment and the state information $c\_t$ of the LSTM at the current moment. In this embodiment, the $c\_t$ output by the first LSTM network may be used as the input $c\_t-1$ of the second LSTM network, and/or the $c\_t$ output by the second LSTM network may be used as the input $c\_t-1$ of the first LSTM network. That is, the first LSTM network and the second LSTM network may exchange the state information unidirectionally or bidirectionally.

In some cases, there is a correlation between the labels. Still taking the painting image as an example, there is a correlation between the category label of "Chinese painting" and the subject label of "flower and bird", there is a correlation between the category label of "oil painting" and the subject label of "mythology", etc., and the specific correlation situations will not be listed one by one. In this embodiment, the LSTM networks exchange the state information, or in other words, the first target label recognizing network and the second target label recognizing network are connected through the LSTM network. Thus, the semantic correlation between the labels can be learnt, and then the accuracy of label recognizing can be improved by using the semantic correlation between the labels.

In some embodiments, the neural network model further includes a third target label recognizing network. The electronic device may acquire a third-type image label output by the third target label recognizing network by recognizing the fused feature by the third target label recognizing network. The electronic device may input the fused feature into the third target label recognizing network, and acquire the third-type image label of the target image output by the third target label recognizing network.

The structure of the third target label recognizing network may be the same as that of the second target label recognizing network, and is not described here.

The third target label recognizing network may output a plurality third-type image labels and confidence of each third-type image label. In this embodiment, a related person may take the third-type image label with the highest confidence as the third-type image label finally determined; or the electronic device may also set a confidence threshold, and take the third-type image label having confidence higher than the confidence threshold as the third-type image label finally determined; or in other embodiments, the third target label recognizing network may also output one third-type image label finally determined, and the data output by the third target label recognizing network is not limited.

In this embodiment, the same neural network model may output three types of labels of the images. Taking that the image to be processed is the painting image as an example, in one case, the first-type image label is a category label of the painting, the second-type image label is the subject label of the painting and the third-type image label is the content label of the painting. Or in the other case, the image to be processed is the painting image, the first-type image label is a category label of the painting, the second-type image label is the content label of the painting and the third-type image label is the subject label of the painting. In other words, when the target image is the painting image, the first-type image label is the category label of the target image; and one of the second-type image label and the third-type image label includes the subject label of the target image, and the other one thereof includes the content label of the target image.

Figure 12:
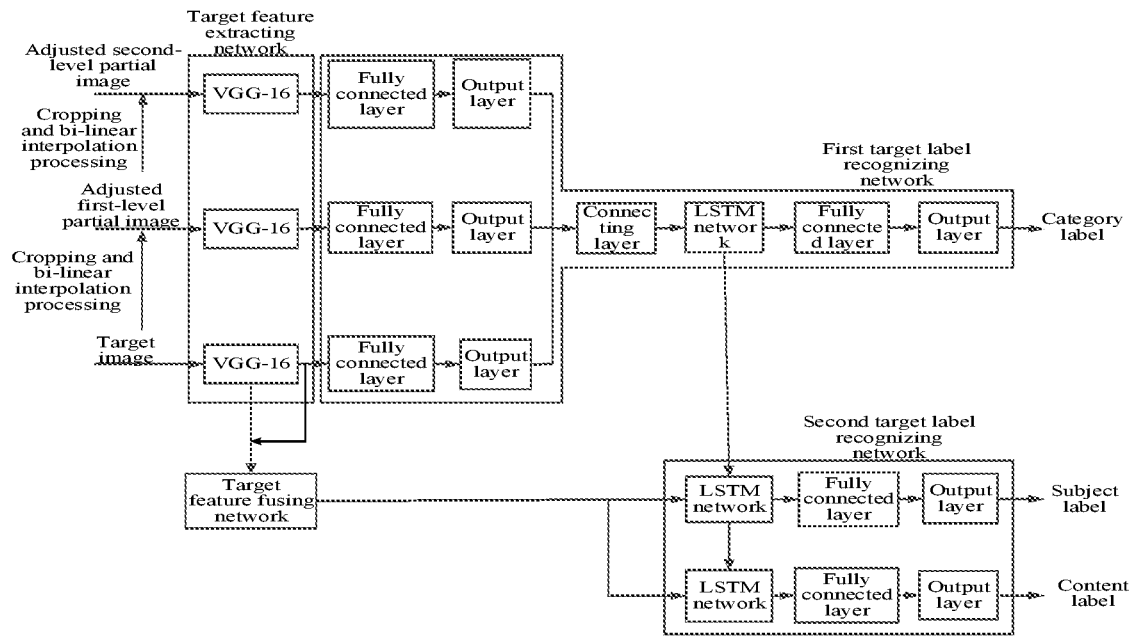
FIG. 12 is a third structural schematic diagram of a neural network model according to an embodiment of the present disclosure.

With reference to FIG. 12, the specific structure of the neural network model is introduced below.

Figure 9:
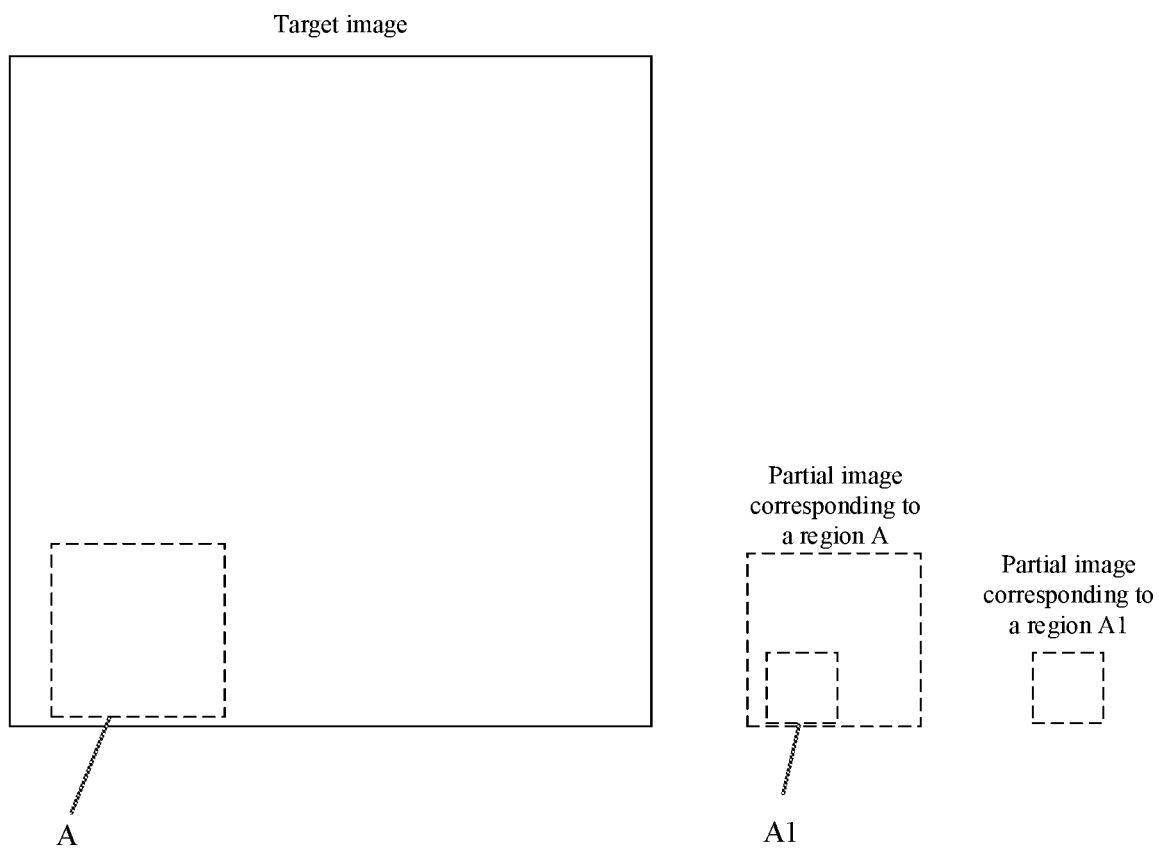
FIG. 9 is a schematic diagram of cropping an image according to an embodiment of the present disclosure.

It is assumed that the target image is the painting image in FIG. 9, a partial image corresponding to a region A, i.e., a first-level partial image, is acquired by cropping this painting image, and the adjusted first-level partial image is acquired by performing bi-linear interpolation processing on the first-level partial image. A partial image corresponding to a region A1, i.e., a second-level partial image, is acquired by cropping the first-level partial image, and the adjusted second-level partial image is acquired by performing bi-linear interpolation processing on the second-level partial image. The sizes of the target image, the adjusted first-level partial image and the adjusted second-level partial image are identical to one another. The target image, the adjusted first-level partial image (the updated first-level partial image) and the adjusted second-level partial image (the updated second-level partial image) are input into different VGG-16 networks respectively.

In FIG. 12, three VGG-16 networks are included, including two second feature extracting networks and one first feature extracting network. Each VGG-16 network is connected to a fully connected layer and the fully connected layer is then connected to an output layer (this output layer may take the softmax function as a loss function). The three output layers are connected to a same connecting layer, and the connecting layer is connected to an LSTM network. The LSTM network is connected to a fully connected layer and this fully connected layer is connected to an output layer (this output layer may take the sigmoid function as a loss function), and the category label is output finally through this output layer. In addition, the VGG-16 network, into which the target image is input, is further connected to one target feature fusing network. The target feature fusing network is connected to two different LSTM networks. These two LSTM networks are connected to different fully connected layers respectively. The fully connected layers are connected to different output layers respectively (the output layers may take the sigmoid function as the loss function) and the two output layers output the subject label and the content label respectively.

The three VGG-16 networks in FIG. 12 may be understood as the target feature extracting network in the above embodiment, and each VGG-16 network may be understood as one sub-network in the target feature extracting network. The fully connected layer, the output layer, the connecting layer, the LSTM network, the fully connected layer, and the output layer which are connected after the VGG-16 network may be understood as the first target label recognizing network in the above embodiment, and the first target label recognizing network outputs the category label. The LSTM network, the fully connected layer, and the output layer connected after the target feature fusing network may be understood as the second target label recognizing network in the above embodiment, and the second target label recognizing network outputs the subject label and the content label.

It may be understood that in training the neural network, it needs to determine whether the network is converged with the loss function, but after the training is completed, it is unnecessary to use the loss function again when the neural network model is used.

The three LSTM networks shown in FIG. 12 may exchange state information with one another. The directions of arrows among these three LSTM networks in FIG. 12 are given for illustration only and do not constitute a limitation to the state information exchange situation of these three LSTM network. The arrows among these three LSTM networks may be one-way arrows or two-way arrows, which is not limited in the present disclosure. As the LSTM networks exchange the state information with one another, the semantic correlation between the labels may be learnt and thus the accuracy of label recognizing may be improved by the semantic correlation between the labels.

Continuing with the above example, and taking the painting image shown in FIG. 9 as the input, the category label finally output by the neural network model shown in FIG. 12 may include "oil painting", the subject label finally output by the neural network model shown in FIG. 12 may include "realism" and "landscape", and the content label finally output by the neural network model shown in FIG. 12 may include "people", "water", "boat", "sky", "cloud", "grass", "tree", "house" and "birds".

The following advantages are achieved when label recognizing is performed on the painting image with the neural network model shown in FIG. 12.

In a first aspect, when the category label of the painting image is recognized, the input of the model includes the partial region of the painting image, and this partial region magnifies the detail information of the painting image and may reflect the detail features of the painting image, such as brushstroke features. Thus, the category label of the painting image can be recognized more accurately.

In a second aspect, when the subject label and the content label of the painting image are recognized, the input of the model is the entire painting image, that is, the subject label and the content label are recognized on the whole. Thus, the recognizing logic is more reasonable. In addition, the target feature fusing network fuses the image features of different dimensions and the fused feature includes both the fine granularity information and the overall image information, thereby further improving the accuracy of recognizing the subject label and the content label.

In a third aspect, as the LSTM networks exchange the state information with one another, the semantic correlation between the labels may be learnt and thus the accuracy of label recognizing may be improved by the semantic correlation between the labels.

A training mode of the neural network model is introduced below.

As described above, the neural network model is acquired by training a neural network of a preset structure based on a sample image and a first-type image label and a second-type image label thereof. In some embodiments, the neural network of the preset structure may be acquired and the structure of the neural network may be any structure introduced in the above embodiment (such the structure shown in FIG. 3, FIG. 10 or FIG. 12). The sample image is input into the neural network, an output result of the neural network is compared with the first-type image label and the second-type image label of the sample image, and based on the comparing result and the loss function in the neural network, the network parameters in the neural network are adjusted iteratively until the neural network is converged, to acquire the trained neural network model.

A specific embodiment of acquiring the neural network model by training is introduced below. The training process may include the following steps.

An initial feature extracting network and an initial feature fusing network are acquired.

A first-type sample image and a label thereof; a second-type sample image and a label thereof and a third-type sample image and a first-type image label and a second-type image label thereof are acquired. In other words, the electronic device may acquire a first sample set, a second sample set and a third sample set. The first sample set includes the first-type sample image and the label thereof; the second sample set includes the second-type sample image and the label thereof; and the third sample set includes the third-type sample image, and the first-type image label and the second-type image label thereof.

A pre-trained feature extracting network (which is also called an intermediate feature extracting network) is acquired by pre-training the initial feature extracting network using the first-type sample image and the label thereof. In other words, the electronic device may acquire the intermediate feature extracting network by training the initial feature extracting network using the first sample set.

A pre-trained feature fusing network (which is also called an intermediate feature fusing network) is acquired by pre-training the initial feature fusing network using the second-type sample image and the label thereof. In other words, the electronic device may acquire the intermediate feature fusing network by training the initial feature fusing network using the second sample set.

An adjusted feature extracting network and an adjusted feature fusing network are acquired by jointly adjusting the pre-trained feature extracting network and the pre-trained feature fusing network using the third-type sample image, and the first-type image label and the second-type image label thereof. In other words, the electronic device may update the intermediate feature extracting network and the intermediate feature fusing network by training the intermediate feature extracting network and the intermediate feature fusing network using the third sample set.

The trained neural network model is acquired by training a to-be-trained neural network using the third-type sample image, and the first-type image label and the second-type image label thereof. The to-be-trained neural network includes the adjusted feature extracting network (i.e., the updated pre-trained feature extracting network), a first initial label recognizing network and the adjusted target feature fusing network (i.e., the updated pre-trained feature fusing network) which are connected to the adjusted feature extracting network, and a second initial label recognizing network connected to the adjusted target feature fusing network.

It may be understood that the to-be-trained neural network and the trained neural network model have the same structure and the training process is a process for adjusting iteratively network parameters. The to-be-trained neural network includes the target feature extracting network, the target feature fusing network, the first target label recognizing network, the second target label recognizing network and the like. The target feature extracting network is acquired by training the intermediate feature extracting network; the target feature fusing network is acquired by training the intermediate feature fusing network; the first target label recognizing network is acquired by training the first initial label recognizing network; the second target label recognizing network is acquired by training the second initial label recognizing network; and the target feature extracting network includes the first feature extracting network and the second feature extracting network.

Optionally, prior to training the to-be-trained neural network using the third sample set, the electronic device may also train the intermediate feature extracting network and the intermediate feature fusing network without using the third sample set.

For distinguishing description, when these networks are not trained, they are called initial networks. After these networks are pre-trained, they are called adjusted networks. The network structures of the respective networks may be seen with reference to the related description in the above embodiment, and are not described here.

In some embodiments, the first-type sample image and the second-type sample image are non-painting images, and the third-type sample image is the painting image.

For example, the first-type sample image may be images in the Imagenet public data set, or images in other open-source image libraries. At least one of the first-type sample image and the second-type sample image may be a photographic image similar to the painting image or other similar images. The third-type sample image is the painting image. It can be seen that in this embodiment, part of networks of the neural network is pre-trained using the non-painting sample image firstly and then the pre-trained neural network is adjusted using the painting sample image. In this way, the neural network model for recognizing labels of the painting image may be acquired by training with a small number of painting sample images, which reduces the demand for painting images during the training process, thereby reducing the training cost.

The label of the first-type sample image is a single label of an ordinary image, such as a label of the image in the Imagenet public data set. The label of the second-type sample image may also be a single label of an ordinary image, such as the labels of people and landscape of the photographic image. The first-type image label of the third-type sample image may be the category label of the painting image and the second-type image label of the third-type sample image may be the subject label and the content label of the painting image.

The types of the above first-type sample image, the second-type sample image and the third-type sample image are not limited. The following description is given by taking that the first-type sample image is the image in the Imagenet public data set, the second-type sample image is the photographic image and the third-type sample image is the painting image as an example.

The trained neural network model is shown as in FIG. 12. The VGG-16 and the feature fusing network in the entire network are trained firstly. The following three steps may be included. 1) Pre-trained network parameters of the VGG-16 are acquired by pre-training the VGG-16 firstly based on the image in the Imagenet public data set and the label thereof. 2) Pre-trained network parameters of the feature fusing network are acquired by pre-training the feature fusing network using the photographic image and the label thereof. 3) The pre-trained network parameters acquired in 1) and 2) are loaded into the VGG-16 and the feature fusing network shown in FIG. 12, and then the VGG-16 and the feature fusing network are slightly adjusted based on the painting image, and the category label, the subject label and the content label thereof. Slight adjusting here refers to jointly adjusting the VGG-16 and the feature fusing network and network parameters of these two parts acquired after slight adjusting are saved.

Afterwards, the overall network is trained, which may include the following steps. 1) The saved network parameters of these two parts, i.e., the VGG-16 and the feature fusing network, are loaded into the VGG-16 and the feature fusing network respectively in the overall network. 2) The final network parameter is acquired by training the overall network based on the painting image, and the category label, the subject label and the content label which correspond to the painting image. The neural network model is acquired by loading the final network parameter into the overall network.

In some embodiments, the step that the third-type sample image, and the first-type image label and the second-type image label thereof are acquired may include: painting sample images and first-type image labels and second-type image labels thereof are acquired; in the acquired painting sample images, the number of the painting sample images corresponding to each type of label is determined; if the number is greater than a first preset threshold, under-sampling processing is performed on the painting sample images corresponding to the number; and if the number is less than a second preset threshold, over-sampling processing is performed on the painting sample images corresponding to the number, wherein the second preset threshold is less than the first preset threshold. Afterwards, the third-type sample image may be acquired.

For example, it is assumed that the first preset threshold is 700 and the second preset threshold is 500. If the number of painting images corresponding to the category label of "Chinese painting" is 100, and the number of painting images corresponding to the category label of "oil painting" is 1000, over-sampling processing may be performed on the painting images corresponding to the category label of "Chinese painting" and under-sampling processing may be performed on the painting images corresponding to the category label of "Chinese painting". In this way, the numbers of painting images corresponding to respective labels used for training are balanced. The specific values of the first preset threshold and the second preset threshold may be set according to actual conditions, and are not limited here.

It can be seen that by using this embodiment, the numbers of painting images corresponding to respective labels used for training are balanced. Thus, the training effect is improved and the accuracy of label recognizing by the neural network model is further improved.

In some embodiments, if the number is less than the second preset threshold, the third-type sample image may be acquired by performing data enhancement processing on the painting sample images corresponding to the number, and then performing oversampling processing on the painting sample images subjected to data enhancement processing.

In the above embodiment, if the number of painting sample images corresponding to certain label is smaller, oversampling processing may be performed on the painting sample images corresponding to this label. In this embodiment, data enhancement processing may be performed on the painting sample images corresponding to this label and then oversampling processing is performed on the painting sample images subjected to data enhancement processing. In this way, a smaller number of painting images may be further supplemented.

For example, the data enhancement mode may include: partial cropping, image rotating, noise increasing, color changing and the like. The enhancement mode is not limited.

By using the embodiment shown in the present disclosure, in a first aspect, the same neural network model can output a plurality of labels of the image and thus a solution that the plurality of labels of the image can be generated is provided.

In a second aspect, the target feature fusing network fuses the image features of different dimensions and the fused feature includes both the fine granularity information and the overall image information, thereby further improving the accuracy of label recognizing.

In a third aspect, the input of the neural network model includes the partial region of the entire image, and this partial region magnifies the detail information of the painting image and may reflect the detail features of the image, such as brushstroke features. The oil painting images can be distinguished from gouache images based on the brushstroke features. Therefore, this solution improves the accuracy of label recognizing.

In a fourth aspect, the first target label recognizing network and the second target label recognizing network are connected through the LSTM network. The semantic correlation between the labels can be learnt, and then the accuracy of label recognizing can be improved by using the semantic correlation between the labels.

In a fifth aspect, in the process of training the neural network, part of the neural network is pre-trained using the non-painting sample image firstly and then the pre-trained neural network is adjusted using the painting sample image. In this way, the neural network model for recognizing labels of painting images may be acquired by training using a small number of painting sample images, which reduces the demand for painting images during the training process, thereby reducing the training cost.

Figure 13:
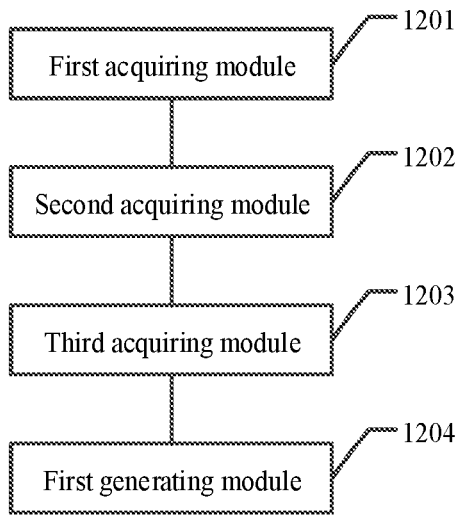
FIG. 13 is a structural schematic diagram of an apparatus for generating an image label according to an embodiment of the present disclosure.

Corresponding to the above method embodiments, embodiments of the present disclosure also provide an apparatus for generating an image label. As shown in FIG. 13, the apparatus includes:
  a first acquiring module 1201 configured to acquire a target image with a label to be generated;
  a second acquiring module 1202 configured to acquire a partial image of the target image;
  a third acquiring module 1203 configured to acquire a plurality of features based on the target image and the partial image, wherein the plurality of features include a first feature of the target image and a second feature of the partial image; and
  a first generating module 1204 configured to generate a first-type image label of the target image based on the first feature and the second feature.

Optionally, the second acquiring module 1202 is configured to acquire a plurality of partial images of the target image.

Optionally, the plurality of partial images have different sizes, and include a same region of the target image.

Optionally, the apparatus for generating the image label further includes:
  an adjusting module (not shown in FIG. 13) configured to update the partial image by adjusting a size of the partial image to be a size of the target image.

Optionally, the adjusting module is configured to acquire an adjusted partial image by performing bi-linear interpolation processing on the partial image.

Optionally, the third acquiring module 1203 is configured to:
  input the target image into a first feature extracting network;
  acquire the first feature output by the first feature extracting network;
  input the partial image into a second feature extracting network; and
  acquire the second feature of the partial image output by the second feature extracting network.

Optionally, the first feature extracting network includes an intermediate level configured to output an intermediate layer feature and an output level configured to output the first feature, the plurality of features further including the intermediate layer feature and the intermediate layer feature and the first feature having different dimensions.

The apparatus for generating the image label further includes:
  a second generating module (not shown in FIG. 13) configured to generate a second-type image label of the target image based on the intermediate layer feature and the first feature.

Optionally, the second generating module is configured to:
  acquire a fused feature based on the intermediate layer feature and the first feature; and
  generate the second-type image label based on the fused feature.

Optionally, the second generating module is configured to:
  input the intermediate layer feature and the first feature into a target feature fusing network; and acquire the fused feature output by the target feature fusing network.

Optionally, the first feature extracting network includes n intermediate levels and one output level, wherein n>2, an $n^{th}$ intermediate level is connected to the output level, the intermediate level includes a convolutional layer and a pooling layer, different intermediate levels output intermediate layer features of different dimensions respectively, and the output level includes a pooling layer and a fully connected layer;

the target feature fusing network includes: a first-type convolutional layer and n second-type convolutional layers, wherein the first-type convolutional layer is configured to perform convolutional processing on the first feature, an $i^{th}$ second-type convolutional layer is configured to perform convolutional processing on an intermediate layer feature output by an $(n+1-i)^{th}$ intermediate level, and $1 \leq i \leq n$;

when n>1, the target feature fusing network further includes: a first-type up-sampling layer and n−2 second-type up-sampling layers, wherein the first-type up-sampling layer is configured to perform up-sampling on a convolutional feature output by the first-type convolutional layer and a convolutional feature output by a first second-type convolutional layer; a $j^{th}$ second-type up-sampling layer is configured to perform up-sampling on an up-sampling feature output by a previous up-sampling layer and a convolutional feature output by a $(j+1)^{th}$ second-type up-sampling layer, where $1 \leq j \leq n-2$; when j=1, the previous up-sampling layer is the first-type up-sampling layer; and when j>1, the previous up-sampling layer is a $(j-1)^{th}$ second-type up-sampling layer; and the fused feature output by the target feature fusing network is a feature added up by an up-sampling feature output by an $(n-2)^{th}$ second-type up-sampling layer and a convolutional feature output by an $n^{th}$ second-type convolutional layer.

Optionally, the first generating module is configured to:
input the first feature and the second feature into a first target label recognizing network; and
acquire the first-type image label output by the first target label recognizing network;
the second generating module is configured to:
input the fused feature into a second target label recognizing network; and
acquire the second-type image label output by the second target label recognizing network.

Optionally, the apparatus for generating the image label meets at least one of the following conditions:
the first target label recognizing network is configured to output the first-type image label based on the first feature, the second feature, and first information in the second target label recognizing network; and
the second target label recognizing network is configured to output the second-type image label based on the fused feature and the second information in the first target label recognizing network.

Optionally, the first target label recognizing network includes a first time recurrent neural network; and the first information includes information output by the first time recurrent neural network;
the second target label recognizing network includes a second time recurrent neural network; the second information includes information output by the second time recurrent neural network.

Optionally, the second-type image label includes a plurality of sub-type image labels.

Optionally, the apparatus for generating the image label further includes:
a third generating module configured to input the fused feature into a third target label recognizing network; and acquire a third-type image label of the target image output by the third target label recognizing network.

Optionally, the target image is a painting image; the first-type image label is a category label of the target image; and one of the second-type image label and the third-type image label includes a subject label of the target image, and the other one thereof includes a content label of the target image.

Optionally, the first generating module is configured to:
input the first feature and the second feature into a first target label recognizing network; and
acquire the first-type image label output by the first target label recognizing network;

Optionally, the second generating module is configured to:
input the fused feature into a second target label recognizing network; and
acquire the second-type image label output by the second target label recognizing network.

The apparatus for generating the image label further includes:
a fourth acquiring module (not shown in FIG. 13) configured to acquire a first sample set, a second sample set and a third sample set, wherein the first sample set includes a first-type sample image and a label thereof; the second sample set includes a second-type sample image and a label thereof; and the third sample set includes a third-type sample image, and the first-type image label and the second-type image label thereof;
a first training module (not shown in FIG. 13) configured to acquire an intermediate feature extracting network by training an initial feature extracting network using the first sample set;
a second training module (not shown in FIG. 13) configured to acquire an intermediate feature fusing network by training an initial feature fusing network using the second sample set; and
a third training module (not shown in FIG. 13) configured to acquire a neural network model by training a to-be-trained neural network using the third sample set,
wherein the to-be-trained neural network includes the intermediate feature extracting network, the intermediate feature fusing network, a first initial label recognizing network and a second initial label recognizing network;
the neural network model includes a target feature extracting network, the target feature fusing network, the first target label recognizing network, and the second target label recognizing network;
the target feature extracting network is acquired by training the intermediate feature extracting network; the target feature fusing network is acquired by training the intermediate feature fusing network; the first target label recognizing network is acquired by training the first initial label recognizing network; the second target label recognizing network is acquired by training the second initial label recognizing network; and the target feature extracting network includes the first feature extracting network and the second feature extracting network.

Optionally, the apparatus for generating the image label further includes:
a fourth training module (not shown in FIG. 13) configured to update the intermediate feature extracting network and the intermediate feature fusing network by training the intermediate feature extracting network and the intermediate feature fusing network using the third sample set.

Optionally, the target image is a painting image, the first-type sample image and the second-type sample image are non-painting images, and the third-type sample image is the painting image.

Figure 14:
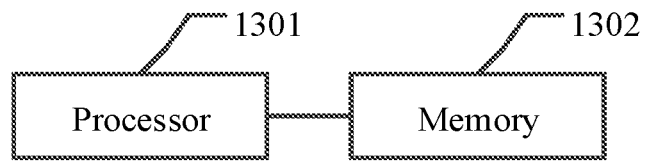
FIG. 14 is a structural schematic diagram of an electronic device according to an embodiment the present disclosure.

An embodiment of the present disclosure also provides an electronic device. As shown in FIG. 14, the electronic device includes a processor 1301 and a memory 1302.

The memory 1302 is configured to store a computer program.

Wherein the processor 1301, when executing the computer program stored in the memory 1302, is caused to perform the method for generating the image label according to any of the above embodiments.

The memory of the above electronic device may include a random-access memory (RAM), or a non-volatile memory (NVM), such as a magnetic disc memory. Optionally, the memory may be a storage apparatus located away from the processor.

The above processor may be a general processor including a central processing unit (CPU), a network processor (NP), a digital signal processor (DSP), an application specific integrated circuit (ASIC), a field-programmable gate array (FPGA), or other programmable logic device, discrete gate or transistor logic device, discrete hardware component, or the like.

In another embodiment provided by the present disclosure, a non-transitory computer-readable storage medium is provided. The computer-readable storage medium stores a computer program therein. Wherein the computer program, when executed by a processor, causes the processor to perform any one of the above methods for generating the image label.

In yet another embodiment provided by the present disclosure, a computer program product including instructions is provided. When the computer program product runs in a computer, the computer is enabled to execute any one of the above methods for generating the image label.

The above embodiments may be implemented in whole or in part by software, hardware, firmware, or any combination thereof. When implemented by the software, the embodiments may be implemented in the form of a computer program product in whole or in part. The computer program product includes one or more computer instructions. When the computer program instructions are loaded and executed on a computer, the procedures or functions described in the present disclosure are generated in whole or in part. The computer may be a general-purpose computer, a special-purpose computer, a computer network, or other programmable devices. The computer instructions may be stored in a computer-readable storage medium or transmitted from one computer-readable storage medium to another computer-readable storage medium. For example, the computer instructions may be transmitted from a website, computer, server, or data center to another website, computer, server or data center via a wired manner (such as a coaxial cable, an optical fiber and a digital subscriber line (DSL)) or a wireless manner (such as infrared, wireless and microwave). The computer-readable storage medium may be any available medium that can be accessed by the computer or a data storage device such as a server or data center integrated with one or more available media. The available medium may be a magnetic medium (such as a floppy disk, a hard disk and a magnetic tape), an optical medium (for example, a DVD), or a semiconductor medium (for example, a solid-state disk (SSD)), etc.

It should also be noted that in the context, the relational terms such as "first" and "second" are merely used to distinguish one entity or operation from another entity or operation, and do not necessarily require or imply that these entities or operations have any such actual relationship or order. Furthermore, the terms "comprises," "contains," or any other variants are intended to cover the nonexclusive containing, such that the processes, methods, commodities or devices including a series of elements not only comprise those elements, but also comprise other unclearly listed elements, or also comprise the inherent elements of such processes, methods, commodities or devices. Without more limitations, the element defined by the phrase "including a . . . " does not exclude the existence of other same elements in the process, method, commodity, or device that include such element.

The various embodiments in the specification are described in a related manner, the same or similar parts between the various embodiments may be referred to each other, and each embodiment focuses on the differences from the other embodiments. In particular, for the apparatus, device, computer-readable storage medium and computer program product embodiments, since they are basically similar to the method embodiments, the description is relatively simple, and the relevant parts may be referred to the description of the method embodiments.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A method for generating an image label, comprising:
acquiring a target image with a label to be generated;
acquiring a partial image of the target image;
acquiring a plurality of features based on the target image and the partial image, wherein the plurality of features comprises a first feature of the target image and a second feature of the partial image; and
generating a first-type image label of the target image based on the first feature and the second feature,
wherein acquiring the plurality of features based on the target image and the partial image comprises:
inputting the target image into a first feature extracting network;
acquiring the first feature output by the first feature extracting network;
inputting the partial image into a second feature extracting network; and
acquiring the second feature of the partial image output by the second feature extracting network,
wherein the first feature extracting network comprises an intermediate level configured to output an intermediate layer feature and an output level configured to output the first feature, the intermediate layer feature and the first feature having different dimensions, and the plurality of features further comprising the intermediate layer feature; and the method further comprises: generating a second-type
image label of the target image based on the intermediate layer feature and the first feature,
wherein generating the second-type image label of the
target image based on the intermediate layer feature
and the first feature comprises:
acquiring a fused feature based on the intermediate layer
feature and the first feature; and
generating the second-type image label based on the fused
feature,
wherein acquiring the fused feature based on the intermediate layer feature and the first feature comprises:
inputting the intermediate layer feature and the first
feature into a target feature fusing network; and
acquiring the fused feature output by the target feature
fusing network,
wherein the first feature extracting network comprises n
intermediate levels and one output level, wherein n>2,
an nth intermediate level is connected to the output
level, the intermediate level comprises a convolutional
layer and a pooling layer, different intermediate levels
output intermediate layer features of different dimensions respectively, and the output level comprises a
pooling layer and a fully connected layer;
the target feature fusing network comprises: a first-type
convolutional layer and n second-type convolutional
layers, wherein the first-type convolutional layer is
configured to perform convolutional processing on the
first feature, an ith second-type convolutional layer is
configured to perform convolutional processing on an
intermediate layer feature output by an (n+1−i)th intermediate level, and 1≤i≤n;
the target feature fusing network further comprises: a
first-type up-sampling layer and n−2 second-type up-sampling layers, wherein the first-type up-sampling
layer is configured to perform up-sampling on a convolutional feature output by the first-type convolutional
layer and a convolutional feature output by a first
second-type convolutional layer; a jth second-type up-sampling layer is configured to perform up-sampling on
an up-sampling feature output by a previous up-sampling layer and a convolutional feature output by a
(j+1)th second-type up-sampling layer, where 1≤j≤n−2;
when j=1, the previous up-sampling layer is the first-type up-sampling layer; and when j>1, the previous
up-sampling layer is a (j−1)th second-type up-sampling
layer; and
the fused feature output by the target feature fusing
network is a feature added up by an up-sampling
feature output by an (n−2)th second-type up-sampling
layer and a convolutional feature output by an nth
second-type convolutional layer.

2. The method according to claim 1, wherein acquiring the
partial image of the target image comprises:
acquiring a plurality of partial images of the target image
in different sizes, wherein the plurality of partial images
comprise a same region of the target image.

3. The method according to claim 1, wherein prior to
acquiring the plurality of features based on the target image
and the partial image, the method further comprises:
updating the partial image by adjusting a size of the partial
image to be a size of the target image.

4. The method according to claim 1, wherein generating
the first-type image label of the target image based on the
first feature and the second feature comprises:
inputting the first feature and the second feature into a first
target label recognizing network; and
acquiring the first-type image label output by the first
target label recognizing network; and
generating the second-type image label based on the fused
feature comprises:
inputting the fused feature into a second target label
recognizing network; and
acquiring the second-type image label output by the
second target label recognizing network.

5. The method according to claim 4, wherein the method
satisfies at least one of following conditions:
the first target label recognizing network is configured to
output the first-type image label based on the first
feature, the second feature, and first information in the
second target label recognizing network; and
the second target label recognizing network is configured
to output the second-type image label based on the
fused feature and the second information in the first
target label recognizing network.

6. The method according to claim 5, wherein the first
target label recognizing network comprises a first time
recurrent neural network; and the first information comprises information output by the first time recurrent neural
network;
the second target label recognizing network comprises a
second time recurrent neural network; and the second
information comprises information output by the second time recurrent neural network.

7. The method according to claim 1, wherein the second-type image label comprises a plurality of sub-type image
labels.

8. The method according to claim 4, further comprising:
inputting the fused feature into a third target label recognizing network; and
acquiring a third-type image label of the target image
output by the third target label recognizing network.

9. The method according to claim 8, wherein the target
image is a painting image; the first-type image label is a
category label of the target image; and one of the second-type image label and the third-type image label comprises a
subject label of the target image, and the other one comprises
a content label of the target image.

10. The method according to claim 1, wherein generating
the first-type image label of the target image based on the
first feature and the second feature comprises:
inputting the first feature and the second feature into a first
target label recognizing network; and
acquiring the first-type image label output by the first
target label recognizing network;
generating the second-type image label based on the fused
feature comprises:
inputting the fused feature into a second target label
recognizing network; and
acquiring the second-type image label output by the
second target label recognizing network;
prior to acquiring the plurality of features based on the
target image and the partial image, the method further
comprises:
acquiring a first sample set, a second sample set and a
third sample set, wherein the first sample set comprises
a first-type sample image and a label thereof; the
second sample set comprises a second-type sample
image and a label thereof; and the third sample set
comprises a third-type sample image, and the first-type
image label and the second-type image label thereof;
acquiring an intermediate feature extracting network by
training an initial feature extracting network using the
first sample set;

acquiring an intermediate feature fusing network by training an initial feature fusing network using the second sample set; and acquiring a neural network model by training a to-be-trained neural network using the third sample set, wherein the to-be-trained neural network comprises the intermediate feature extracting network, the intermediate feature fusing network, a first initial label recognizing network and a second initial label recognizing network;

the neural network model comprises a target feature extracting network, the target feature fusing network, the first target label recognizing network and the second target label recognizing network;

the target feature extracting network is acquired by training the intermediate feature extracting network, and comprises the first feature extracting network and the second feature extracting network; the first target label recognizing network is acquired by training the first initial label recognizing network; and the second target label recognizing network is acquired by training the second initial label recognizing network.

11. The method according to claim 10, wherein prior to acquiring the neural network model by training the to-be-trained neural network using the third sample set, the method further comprises:

updating the intermediate feature extracting network and the intermediate feature fusing network by training the intermediate feature extracting network and the intermediate feature fusing network using the third sample set.

12. The method according to claim 10, wherein the target image is a painting image, the first-type sample image and the second-type sample image are non-painting images, and the third-type sample image is the painting image.

13. The method according to claim 11, wherein the target image is a painting image, the first-type sample image and the second-type sample image are non-painting images, and the third-type sample image is the painting image;

acquiring the partial image of the target image comprises: acquiring a plurality of partial images of the target image in different sizes, the plurality of partial images comprising a same region of the target image;

prior to acquiring the plurality of features based on the target image and the partial image, the method further comprises: updating the partial image by adjusting a size of the partial image to be a size of the target image;

the first feature extracting network comprises: n intermediate levels and one output level, wherein n>2, an nth intermediate level is connected to the output level, the intermediate level comprises a convolutional layer and a pooling layer, different intermediate levels output intermediate layer features of different dimensions respectively, and the output level comprises a pooling layer and a fully connected layer;

the target feature fusing network comprises: a first-type convolutional layer and n second-type convolutional layers, wherein the first-type convolutional layer is configured to perform convolutional processing on the first feature, an ith second-type convolutional layer is configured to perform convolutional processing on an intermediate layer feature output by an (n+1−i)th intermediate level, and 1≤i≤n; the target feature fusing network further comprises: a first-type up-sampling layer and n−2 second-type up-sampling layers, wherein the first-type up-sampling layer is configured to perform up-sampling on a convolutional feature output by the first-type convolutional layer and a convolutional feature output by a first second-type convolutional layer; a jth second-type up-sampling layer is configured to perform up-sampling on an up-sampling feature output by a previous up-sampling layer and a convolutional feature output by a (j+1)th second-type up-sampling layer, where 1≤j≤n−2; when j=1, the previous up-sampling layer is the first-type up-sampling layer; and when j>1, the previous up-sampling layer is a (j−1)th second-type up-sampling layer; and the fused feature output by the target feature fusing network is a feature added up by an up-sampling feature output by an (n−2)th second-type up-sampling layer and a convolutional feature output by an nth second-type convolutional layer;

the first target label recognizing network is configured to output the first-type image label based on the first feature, the second feature, and information output by a second time recurrent neural network in the second target label recognizing network; and the second target label recognizing network is configured to output the second-type image label based on the fused feature and information output by a first time recurrent neural network in the first target label recognizing network;

the target image is a painting image; the first-type image label is a category label of the target image; and the second-type image label comprises a subject label of the target image and a content label of the target image.

14. An electronic device comprising a processor and a memory configured to store a computer program, wherein the processor, when executing the computer program, is caused to perform:

acquiring a target image with a label to be generated;

acquiring a partial image of the target image;

acquiring a plurality of features based on the target image and the partial image, wherein the plurality of features comprises a first feature of the target image and a second feature of the partial image; and generating a first-type image label of the target image based on the first feature and the second feature, wherein acquiring the plurality of features based on the target image and the partial image comprises:

inputting the target image into a first feature extracting network;

acquiring the first feature output by the first feature extracting network;

inputting the partial image into a second feature extracting network; and acquiring the second feature of the partial image output by the second feature extracting network, wherein the first feature extracting network comprises an intermediate level configured to output an intermediate layer feature and an output level configured to output the first feature, the intermediate layer feature and the first feature having different dimensions, and the plurality of features further comprising the intermediate layer feature; and the processor, when executing the computer program, is caused to further perform:

generating a second-type image label of the target image based on the intermediate layer feature and the first feature, wherein generating the second-type image label of the target image based on the intermediate layer feature and the first feature comprises:

acquiring a fused feature based on the intermediate layer feature and the first feature; and generating the second-type image label based on the fused feature,
wherein acquiring the fused feature based on the intermediate layer feature and the first feature comprises:
inputting the intermediate layer feature and the first feature into a target feature fusing network; and
acquiring the fused feature output by the target feature fusing network,
wherein the first feature extracting network comprises n intermediate levels and one output level, wherein n>2, an nth intermediate level is connected to the output level, the intermediate level comprises a convolutional layer and a pooling layer, different intermediate levels output intermediate layer features of different dimensions respectively, and the output level comprises a pooling layer and a fully connected layer;
the target feature fusing network comprises: a first-type convolutional layer and n second-type convolutional layers, wherein the first-type convolutional layer is configured to perform convolutional processing on the first feature, an ith second-type convolutional layer is configured to perform convolutional processing on an intermediate layer feature output by an (n+1−i)th intermediate level, and 1≤i≤n;
the target feature fusing network further comprises: a first-type up-sampling layer and n−2 second-type up-sampling layers, wherein the first-type up-sampling layer is configured to perform up-sampling on a convolutional feature output by the first-type convolutional layer and a convolutional feature output by a first second-type convolutional layer; a jth second-type up-sampling layer is configured to perform up-sampling on an up-sampling feature output by a previous up-sampling layer and a convolutional feature output by a (j+1)th second-type up-sampling layer, where 1≤j≤n−2; when j=1, the previous up-sampling layer is the first-type up-sampling layer; and when j>1, the previous up-sampling layer is a (j−1)th second-type up-sampling layer; and
the fused feature output by the target feature fusing network is a feature added up by an up-sampling feature output by an (n−2)th second-type up-sampling layer and a convolutional feature output by an nth second-type convolutional layer.

15. A non-transitory computer-readable storage medium storing a computer program thereon, wherein
the computer program, when executed by a processor, causes the processor to perform:
acquiring a target image with a label to be generated;
acquiring a partial image of the target image;
acquiring a plurality of features based on the target image and the partial image, wherein the plurality of features comprises a first feature of the target image and a second feature of the partial image; and
generating a first-type image label of the target image based on the first feature and the second feature,
wherein acquiring the plurality of features based on the target image and the partial image comprises:
inputting the target image into a first feature extracting network;
acquiring the first feature output by the first feature extracting network;
inputting the partial image into a second feature extracting network; and
acquiring the second feature of the partial image output by the second feature extracting network,
wherein the first feature extracting network comprises an intermediate level configured to output an intermediate layer feature and an output level configured to output the first feature, the intermediate layer feature and the first feature having different dimensions, and the plurality of features further comprising the intermediate layer feature; and
the computer program, when executed by a processor, causes the processor to further perform:
generating a second-type image label of the target image based on the intermediate layer feature and the first feature,
wherein generating the second-type image label of the target image based on the intermediate layer feature and the first feature comprises:
acquiring a fused feature based on the intermediate layer feature and the first feature; and
generating the second-type image label based on the fused feature,
wherein acquiring the fused feature based on the intermediate layer feature and the first feature comprises:
inputting the intermediate layer feature and the first feature into a target feature fusing network; and
acquiring the fused feature output by the target feature fusing network,
wherein the first feature extracting network comprises n intermediate levels and one output level, wherein n>2, an nth intermediate level is connected to the output level, the intermediate level comprises a convolutional layer and a pooling layer, different intermediate levels output intermediate layer features of different dimensions respectively, and the output level comprises a pooling layer and a fully connected layer;
the target feature fusing network comprises: a first-type convolutional layer and n second-type convolutional layers, wherein the first-type convolutional layer is configured to perform convolutional processing on the first feature, an ith second-type convolutional layer is configured to perform convolutional processing on an intermediate layer feature output by an (n+1−i)th intermediate level, and 1≤i≤n;
the target feature fusing network further comprises: a first-type up-sampling layer and n−2 second-type up-sampling layers, wherein the first-type up-sampling layer is configured to perform up-sampling on a convolutional feature output by the first-type convolutional layer and a convolutional feature output by a first second-type convolutional layer; a jth second-type up-sampling layer is configured to perform up-sampling on an up-sampling feature output by a previous up-sampling layer and a convolutional feature output by a (j+1)th second-type up-sampling layer, where 1≤j≤n−2; when j=1, the previous up-sampling layer is the first-type up-sampling layer; and when j>1, the previous up-sampling layer is a (j−1)th second-type up-sampling layer; and
the fused feature output by the target feature fusing network is a feature added up by an up-sampling feature output by an (n−2)th second-type up-sampling layer and a convolutional feature output by an nth second-type convolutional layer.

* * * * *